United States Patent [19]
Podesta et al.

[11] 3,741,649
[45] June 26, 1973

[54] METHOD OF MAKING MULTI-COLOR SLIDE TRANSPARENCIES WITH SUPERIMPOSED IMAGES

[75] Inventors: Dorothy A. Podesta, Bronx; Judy L. Cardillo, Yonkers; Nancy E. Eisele, Pleasantville, all of N.Y.; Eileen Fox, Brookfield Center, Conn.; Margaret L. Neste, Mahopac, N.Y.

[73] Assignee: Harcourt Brace Jovanovich, Inc., New York, N.Y.

[22] Filed: Apr. 5, 1971

[21] Appl. No.: 131,190

[52] U.S. Cl. ................ 355/88, 95/12.2, 352/42, 355/32, 355/132
[51] Int. Cl. .......................................... G03b 27/04
[58] Field of Search ............... 355/88, 79, 32, 77, 355/132; 95/12.2; 96/24, 25; 352/67, 42

[56] References Cited
UNITED STATES PATENTS
1,840,524 1/1938 Peck .................... 355/132
3,000,737 9/1961 Barnhart .................... 355/32 X

OTHER PUBLICATIONS

"Three Color Photography" pg. 219 in Photographic Optics & Color Photography by George L. Johnson.

*Primary Examiner*—Richard L. Moses
*Attorney*—Kenyon & Kenyon Reilly Carr & Chapin

[57] ABSTRACT

The process uses the steps of double exposing a film to two specifically selected colors for the purpose of achieving a third color on the transparency. After the film has been exposed to one color to provide a background color, a layer containing an image of a second different color is exposed to the film within the area of the background color so that a latent image of a third color is produced on the film corresponding to the image of the layer.

16 Claims, 6 Drawing Figures

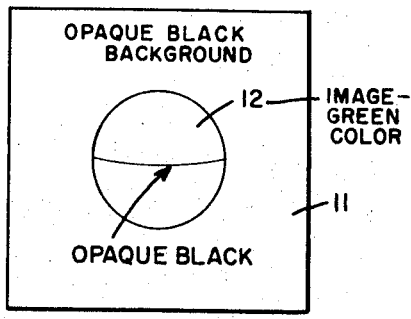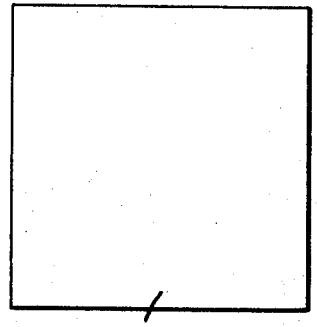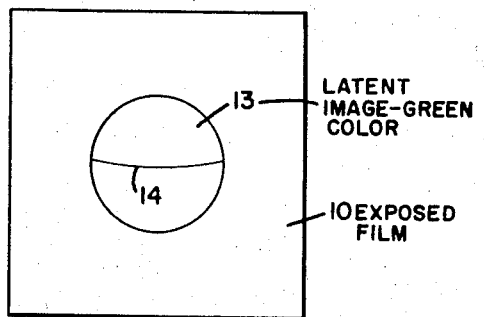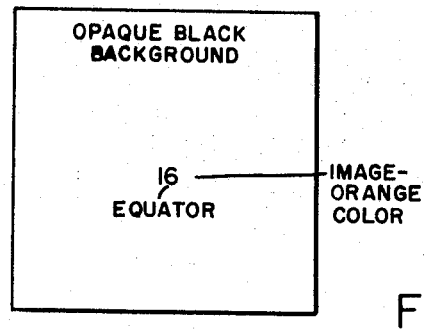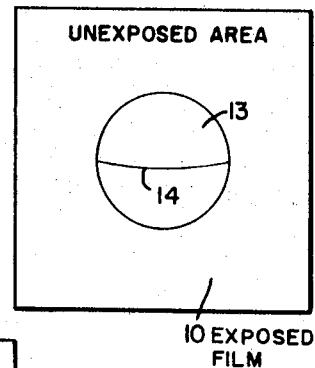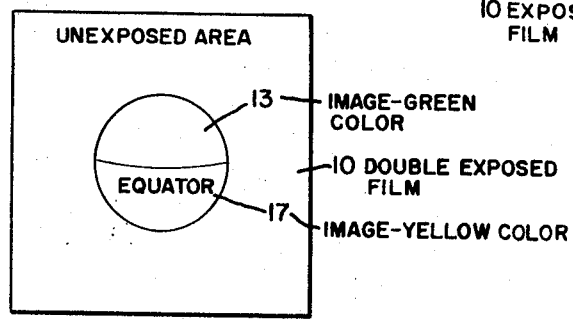

METHOD OF MAKING MULTI-COLOR SLIDE TRANSPARENCIES WITH SUPERIMPOSED IMAGES

This invention relates to a process for superimposing differently colored images on each other in the production of a slide transparency.

It has been known, as set forth in U.S. Pat. No. 3,600,087, to produce slide transparencies of high intensity colors and quality for projection in daylight. Generally, where such a slide transparency is to have a colored background area thereon with superimposed lettering or other image thereon, it has been necessary to prepare two separate layers of overlays of transparent gels which can be precisely registered with respect to each other for successive exposures to unexposed areas of a film. For example, in order to produce a slide containing an image of the Earth with a line thereon representative of and labelled "equator," one layer would be prepared with a transparent colored gel area thereon representative of the Earth image with the term "equator" blocked out within the image area, as by an opaque black ink or opaque film. A second layer would also be prepared containing the term "equator" colored and defined by a second transparent gel with the remainder of the layer being completely opaque black. The first layer would then be exposed to the film to produce a colored latent image on the film corresponding to the image on the layer along with a blocked out area corresponding to the term "equator." The second layer would then be exactly registered with the film so that the colored lettering would be aligned over the blocked out area on the film. The second layer would then be exposed to give color to the blocked out area. This technique has, however, been found to be unable to guarantee perfect registration when coloring small areas or thin letters within a larger colored area as the slightest shifting of one of the layers or the shrinkage of one of these layers due to temperature change and the like can cause a ghosted image on the film and resultant slide transparency.

Accordingly, it is an object of this invention to ensure registration of successively exposed colored images to a film for producing a slide transparency.

It is another object of the invention to provide a technique in which a colored image can be superimposed on a latent image of a previously exposed and differently colored image to produce a multi-color slide transparency.

Briefly, the invention provides a process in which a first layer containing a first colored image against a background of opaque black is exposed to a film and thereafter a second layer containing a second colored image is exposed to the previously exposed area of the film to produce a second image within the doubly exposed area of a third color. The film is then used as is known to produce slide transparencies of multi-color with an image corresponding to the first image and a differently colored second image within the first image.

It is to be noted that controlled double exposing, or "burn out," in which two specifically selected colors are deliberately double exposed for the purpose of achieving a third different color has been known. Generally, this phenomena of photography usually results in the film being ruined or washed out by the exposure of one image directly over the same area of another image. However, in the present invention, it has been found that this burn out technique can be used to obtain advantageous results when certain color combinations are double exposed to a film to obtain a desired third color on the film. This is especially effective where it is necessary to color a very small area within a larger area of a different color.

These and other objects and advantages of the invention will become more apparent from the following detailed description and appended claims taken in conjunction with the accompanying drawings in which:

FIG. 1 illustrates a first layer containing a transparent colored gel area utilized in the process of the invention;

FIG. 2 illustrates an unexposed film utilized in the process of the invention;

FIG. 3 illustrates the film of FIG. 2 exposed once in accordance with the process of the invention;

FIG. 4 illustrates a second layer containing a transparent colored gel area defined by the term "equator";

FIG. 5 illustrates a view similar to FIG. 3 of the singly exposed film for juxtaposition with the layer of FIG. 4; and FIG. 6 illustrates the film of FIG. 5 exposed twice.

Referring to FIGS. 1 and 2, in order to carryout the process, an unexposed film 10 (FIG. 2) is positioned at a predetermined position and a first layer 11 containing a transparent colored area 12 thereon defined by a transparent colored gel is positioned in alignment with the film 10. Thereafter, the transparent colored area 12 of the layer 11 is exposed to the film 10 such as by passing light such as white light through the transparent colored area 12 towards the film 10. This causes a latent background image 13 (FIG. 3) to be formed on the exposed film 10 corresponding to the shape and color of the transparent area 12 of the layer. For example, as shown in FIG. 3, the first layer is used to form a latent image 13 on the film 10 which represents the spheroid Earth as a solid disc of color with a line 14 passing through the image 13 corresponding to the equitorial line of the Earth. The image 13 is further of a color, such as, green corresponding to the transparent gel while the surrounding background and the equitorial line 14 is opaque black. By using an opaque black, as is known, the film 10 is not exposed when light is passed through the transparent area 12 of the layer 11.

Next, referring to FIGS. 4 and 5 the first layer is replaced by a second layer 15 containing a transparent area 16 defined by a transparent colored gel of a different color from the first. This second layer 15 is aligned with the exposed film 10 so that the transparent area 16 thereon is aligned within the latent background image 13 on the film 10. The transparent area 16 of the second layer 15 (FIG. 4) is then exposed to the film 10 (FIG. 5) so as to form a second latent image 17 on the film 10 within the latent background image 13 which is of a third color different from the colors of the gel of the two layers 11, 15. For example, referring to FIG. 4, the transparent area 16 of the second layer 15 defines the lettering for the term "equator" so that a latent image 17 corresponding to this term is superimposed on the background image 13 of the double exposed film 10. Where the transparent gel of the second layer is of an orange color, the latent image 17 of the term "equator" formed on the film 10 is yellow in color.

In some embodiments, it is possible to align a number of colored layers of transparent gels with each other for single exposure to the film in order to produce either or both of the latent background image and latent superimposed image. Further, in the case of the latent background image, these layers can be of different colors so as to produce a latent backround image of a color corresponding to the mixture of colors of the layers.

In addition to the above example, the superimposing of different color combinations have been found to obtain usable third colors. However, some experiments have been carried out on a number of color combinations which have not produced a usable image.

In order to provide a guideline for determining which color combinations are acceptable and which are not, the following table is set forth of those color combinations which have been tested. In this table, the numerical color code represents the code used by Rosco Laboratories Inc., for transparent colored gels manufactured thereby under the name ROSCOGEL. It is noted, however, that any suitable transparent colored gels can be used in accordance with the process described above.

(Number in parentheses signifies number of layers of color used)

| Background Color | Color Exposed into Background Color | Resulting Third Color |
|---|---|---|
| (1)278 & (1)217 | (2)212 | Yellow |
| " | (1)213 | Yellow |
| " | (2)215 | Orange |
| " | (2)216 | Orange |
| " | (1)217 | Orange |
| " | (1)219 | Orange |
| " | (2)275 | Light Blue |
| " | (2)278 | Light Green |
| " | (1)220 | Dark Orange |
| " | (1)221 | Dark Orange |
| " | (2)227 | Light Pink |
| " | (2)230 | Salmon |
| " | (2)232 | Salmon |
| " | (2)236 | Pink |
| " | (2)245 | Pink |
| " | (1)246 | Dark Pink |
| (1)214 & (2)252 | (2)212 | Yellow |
| " | (1)213 | Yellow |
| " | (2)215 | Orange |
| " | (2)216 | Light Orange |
| " | (1)217 | Dark Orange |
| " | (1)219 | Dark Orange |
| (1)214 & (2)252 | (2)275 | Light Blue |
| " | (2)278 | Light Green |
| " | (1)220 | Red Orange |
| " | (1)221 | Red Orange |
| " | (2)227 | Light Pink |
| " | (2)230 | Dark Pink |
| " | (2)232 | Dark Pink |
| " | (2)236 | Light Pink |
| " | (2)245 | Light Pink |
| " | (1)246 | Dark Pink |
| (1)232 & (1)278 | (2)212 | Yellow |
| " | (1)213 | Yellow |
| " | (2)215 | Dark Orange |
| " | (2)216 | Light Orange |
| " | (1)217 | Orange |
| " | (1)219 | Dark Orange |
| " | (2)275 | Light Blue |
| " | (2)278 | Yellow Green |
| " | (1)220 | Red |
| " | (1)221 | Red |
| " | (2)227 | Light Pink |
| " | (2)230 | Salmon |
| " | (2)232 | Salmon |
| " | (2)236 | Lt. Pink |
| (1)214 & (2)252 | (2)275 | Light Blue |
| " | (2)278 | Light Green |
| " | (1)220 | Red Orange |
| " | (1)221 | Red Orange |
| " | (2)227 | Light Pink |
| " | (2)230 | Dark Pink |
| " | (2)232 | Dark Pink |
| " | (2)236 | Light Pink |
| " | (2)245 | Light Pink |
| " | (1)246 | Dark Pink |
| (1)232 & (1)278 | (2)212 | Yellow |
| " | (1)213 | Yellow |
| " | (2)215 | Dark Orange |
| " | (2)216 | Light Orange |
| " | (1)217 | Orange |
| " | (1)219 | Dark Orange |
| " | (2)275 | Light Blue |
| (1)232 & (1)278 | " | " |
| (2)278 & (2)213 | " | " |
| " | " | " |
| " | " | " |
| " | " | " |
| " | " | " |
| " | " | " |
| (2)258 | " | " |
| " | " | " |
| " | " | " |
| " | " | " |
| " | " | " |
| " | " | " |
| (2)270 | " | " |
| " | " | " |
| " | " | " |
| " | " | " |
| " | " | " |
| (2)278 | " | " |
| " | " | " |
| " | " | " |
| " | " | " |
| " | " | " |
| " | " | " |
| (2)215 & (1)271 | " | " |
| " | " | " |
| " | " | " |
| " | " | " |
| " | " | " |
| " | " | " |
| " | " | " |
| " | " | " |
| 232 & 278 | " | " |
| " | " | " |
| " | " | " |
| " | " | " |
| " | " | " |
| " | " | " |
| " | " | " |
| "(1)220 232 & 278 | " | " |
| " | " | " |
| " | " | " |
| " | " | " |
| " | " | " |
| (2)227 & (1)278 | " | " |
| " | " | " |
| " | " | " |
| " | " | " |
| " | " | " |
| " | " | " |
| " | " | " |
| " | " | " |
| " | " | " |
| (2) 220 | " | " |
| " | " | " |
| " | " | " |
| " | " | " |
| " | " | " |
| " | " | " |
| " | " | " |
| " | " | " |
| " | " | " |
| " | " | " |
| (2)278 | " | " |

| | | |
|---|---|---|
| " | (2)278 | Yellow Green |
| " | (1)220 | Red |
| " | (1)221 | Red |
| " | (2)227 | Light Pink |
| " | (2)230 | Salmon |
| " | (2)232 | Salmon |
| " | (2)236 | Lt. Pink |
| " | (2)245 | Medium Pink |
| " | (1)246 | Dark Pink |
| " | (2)212 | Yellow |
| " | (1)213 | Yellow |
| " | (2)215 | Orange |
| " | (2)216 | Orange |
| " | (1)217 | Orange |
| " | (1)219 | Orange |
| " | (2)275 | Light Blue |
| " | (2)278 | Yellow Green |
| " | (1)220 | Pink |
| " | (1)221 | Pink |
| " | (2)227 | Lt Pink |
| " | (2)230 | Pink |
| " | (2)232 | Pink |
| " | (2)236 | Pink |
| " | (2)245 | Pink |
| " | (1)246 | Unusable color |
| " | (3)242 | Gray blue |
| " | (3)254 | Unusable color |
| " | (2)212 & (2)252 | Yellow |
| " | (1)278 & (1)232 | Unusable color |
| " | (3)220 | Lt Orange |
| " | (1)212 & (1)254 | Lt Yellow |
| " | (2)212 | Yellow |
| " | (1)213 | Yellow |
| " | (2)215 | Yellow |
| " | (2)216 | Yellow |
| " | (1)217 | Yellow |
| " | (1)219 | Yellow |
| " | (2)275 | Unusable color |
| " | (2)278 | Unusable color |
| " | (2)220 | Dark Orange |
| " | (2)216 | Orange |
| " | (3)212 | Yellow |
| " | (2)278 | Yellow Green |
| " | (1)256 | Blue |
| " | (1)256 | Green |
| " | (2)275 | Blue |
| " | (1)273 | Green |
| " | (2)212 | Yellow |
| " | (1)213 | Yellow |
| " | (2)215 | Orange |
| " | (2)216 | Orange |
| " | (1)217 | Orange |
| " | (1)219 | Orange |
| " | (2)275 | Lt Blue |
| " | (2)278 | Lt Green |
| " | (1)221 | Orange |
| " | (2)227 | Lt Pink |
| " | (2)230 | Salmon |
| " | (2)232 | Salmon |
| " | (2)236 | Lt Pink |
| " | (2)245 | Pink |
| " | (1)246 | Pink |
| " | (2)212 | Yellow |
| " | (1)213 | Yellow |
| " | (2)215 | Orange |
| " | (2)216 | Orange |
| " | (1)217 | Dk Orange |
| " | (1)219 | Dk Orange |
| " | (2)275 | Lt Blue |
| " | (2)278 | Yellow Green |
| " | (1)220 | Red |
| " | (1)221 | Red |
| " | (2)227 | Pink |
| " | (2)230 | Salmon |
| " | (2)232 | Salmon |
| " | (2)236 | Pink |
| " | (2)245 | Pink |
| " | (1)246 | Dk Pink |
| " | (2)212 | Yellow |
| " | (1)213 | Yellow |
| " | (2)215 | Orange |
| " | (2)216 | Lt Orange |
| " | (1)217 | Unusable color |
| " | (1)219 | Unusable color |
| " | (2)275 | Lt Pink |
| " | (2)278 | Yellow |
| " | (3)242 | Unusable color |
| " | (3)254 | Unusable color |
| " | (2)212 & (2)252 | Orange |
| " | (1)278 & (1)232 | Unusable color |
| " | (3)220 | Unusable color |
| " | (2)274 | Unusable color |
| " | (1)274 | Orange |
| " | (1)212 & (1)254 | Unusable color |
| " | (2)212 & (2)252 | Unusable color |

| Filter 1 | Filter 2 | Color |
|---|---|---|
| " | (3)242 | Unusable color |
| " | (3)254 | Unusable color |
| " | (1)232 & (1)278 | Unusable color |
| " | (3)220 | Yellow |
| " | (2)274 | Unusable color |
| " | 274 | Unusable color |
| (2)254 | (1)212 & (1)254 | Unusable color |
| " | (3)242 | Unusable color |
| " | (3)254 | Unusable color |
| " | (2)212 & (2)252 | Unusable color |
| " | (1)278 & (1)232 | Unusable color |
| " | (3)220 | Pink |
| " | (2)274 | Unusable color |
| " | 274 | Unusable color |
| (1)275 & (1)212 | (1)212 & (1)254 | Unusable color |
| " | (3)242 | Unusable color |
| " | (3)254 | Unusable color |
| " | (2)212 & (2)252 | Unusable color |
| " | (1)278 & (1)232 | Unusable color |
| " | (3)220 | Yellow |
| " | (2)274 | Unusable color |
| " | 274 | Unusable color |
| " | (1) 212 & (1)254 | Unusable color |
| " | (2)212 | Yellow |
| " | (1)213 | Yellow |
| " | (2)215 | Yellow |
| " | (2)216 | Yellow |
| " | (1)217 | Yellow |
| " | (1)219 | Yellow |
| " | (2)275 | Unusable color |
| " | (2)278 | Unusable color |
| (1)214 & (2)252 | (3)242 | Unusable color |
| " | (3)254 | Unusable color |
| " | (2)212 & (2)252 | Unusable color |
| " | (1)278 & (1)232 | Unusable color |
| " | (3)220 | Unusable color |
| " | (2)274 | Unusable color |
| " | 274 | Unusable color |
| (2)255 | (1)212 & (1)254 | Unusable color |
| " | (2)212 | White |
| " | (1)213 | White |
| " | (2)215 | Lt Pink |
| " | (2)216 | White |
| " | (1)217 | Pink |
| " | (1)219 | Pink |
| " | (2)275 | Unusable color |
| " | (2)278 | Lt Blue |
| (2)232 & (1)278 | (2)254 | Lavender |
| " | (2)237 | Pink |
| " | (2)220 | Unusable color |
| " | (2)215 | Yellow |
| " | (2)275 | Lt Blue |
| " | (2)278 | Lt Green |
| " | (3)212 | Yellow |
| " | (2)255 | Lavender |
| (1)232 &(1)278 | (3)242 | Lavender |
| " | (3)254 | Lavender |
| " | (2)212 & (2)252 | Yellow |
| " | (1)278 & (1)232 | Orange |
| " | (3)220 | Red |
| " | (2)274 | Unusable color |
| " | 274 | Unusable color |
| " | (1)212 & (1)254 | Yellow |
| 232 & 278 | (3)242 | Unusable color |
| " | (3)254 | Unusable color |
| " | (2)212 & (2)252 | Unusable color |
| " | (1)278 & (1)232 | Unusable color |
| " | (3)220 | Orange |
| " | (2)274 | Unusable color |
| " | 274 | Unusable color |
| (2)227 & (1)278 | (1)212 & (1)254 | Unusable color |
| " | (3)242 | Lavender |
| " | (3)254 | Unusable color |
| " | (2)212 & (2)252 | Lt Orange |
| " | (1)278 & (1)232 | Unusable color |
| " | (3)220 | Orange |
| " | (2)274 | Unusable color |
| " | 274 | Unusable color |
| (2)278 & (2)213 | (1)212 & (1)254 | Unusable color |
| " | (3)242 | Gray |
| " | (3)254 | Blue |
| " | (2)212 & (2)252 | Yellow |
| " | (1)278 & (1)232 | Yellow |
| " | (3)220 | Orange |
| " | (2)274 | Unusable color |
| " | 274 | Unusable color |
| (1)217 & (1)278 | (1)212 & (1)254 | Yellow |
| " | (3)242 | Unusable color |
| " | (3)254 | Unusable color |
| " | (2)212 & (2)252 | Unusable color |
| " | (1)278 & (1)232 | Unusable color |
| " | (3)220 | Orange |
| " | (2)274 | Unusable color |
| " | 274 | Unusable color |
| (2)281 & (1)212 | (1)212 & (1) 254 | Unusable color |
| " | (2)220 | Unusable color |
| " | " | Unusable color |
| (1)280 & (1)281 | " | Unusable color |
| " | " | Unusable color |
| " | " | Unusable color |
| " | " | Unusable color |
| (1)282 & (1)254 | " | Unusable color |
| " | " | Unusable color |
| " | " | Unusable color |
| " | " | Unusable color |
| (2)240 | " | Unusable color |
| " | " | Unusable color |
| " | " | Unusable color |
| " | " | Unusable color |
| " | " | Unusable color |
| (1)280 & (2)252 | " | Unusable color |
| " | " | Unusable color |
| " | " | Unusable color |
| " | " | Unusable color |
| " | " | Unusable color |
| " | " | Unusable color |
| (1)215 & (1)244 | " | Unusable color |
| " | " | Unusable color |
| " | " | Unusable color |
| " | " | Unusable color |
| " | " | Unusable color |
| " | " | Unusable color |
| (1)278 & (2)275 | " | Unusable color |
| " | " | Unusable color |
| " | " | Unusable color |
| " | " | Unusable color |
| " | " | Unusable color |
| " | " | Unusable color |
| (1)250 & (1)220 | " | Unusable color |
| " | " | Unusable color |
| " | " | Unusable color |
| " | " | Unusable color |
| " | " | Unusable color |
| " | " | Unusable color |
| (1)240 & (1)278 | " | Unusable color |
| " | " | Unusable color |
| " | " | Unusable color |
| " | " | Unusable color |
| " | " | Unusable color |
| " | " | Unusable color |
| (2)232 & (1)278 | " | Unusable color |
| " | " | Unusable color |
| " | " | Unusable color |
| " | " | Unusable color |
| " | " | Unusable color |
| " | " | Unusable color |
| (1)275 & (1)244 | " | Unusable color |
| " | " | Unusable color |
| " | " | Unusable color |
| " | " | Unusable color |
| " | " | Unusable color |
| " | " | Unusable color |
| " | (2)216 | Unusable color |
| " | (2)278 | Light Green |
| " | (2)245 | Light blue |
| " | (1)246 | Unusable color |
| " | (3)212 | Lavender |
| " | (1)276 | Yellow |
| " | (3)220 | Unusable color |
| " | (2)216 | Pink |
| " | (3)212 | Orange |
| " | (2)278 | Yellow |
| " | (2)244 | Lt. Green |
| " | (1)213 & (1)278 | Pink |
| " | (2)275 | Yellow |
| " | (1)278 & (1)217 | Lt Blue |
| " | (2)232 | Lt. Orange |
| " | (2)275 | Pink |
| " | (2)278 | Blue |
| " | (1)246 | Green |
| " | (2)220 | Pink |
| " | (3)215 | Pink |
| " | (1)250 | Lt. Pink |
| " | (1)248 | Unusable color |
| " | (3)220 | Unusable color |
| " | (1)246 | Pink |
| " | (1)255 | Unusable color |
| " | (2)275 | Lt. Blue |
| " | (2)278 | Lt. Blue |
| " | (2)232 | Lt Blue |
| " | (1)276 | Pink |
| " | (2)282 | Lt. Blue |
| " | (2)232 | Unusable color |
| " | (2)275 | Light Pink |
| " | (2)278 | blue |
| " | (2)282 | Light green |
| " | (2)220 | Light Pink |
| " | (1)217 & (1)278 | Pink |
| " | (1)256 | Flesh |
| " | (1)248 | Unusable color |
| " | (2)278 | Pink |
| " | (3)212 | Yellow |
| " | (2)210 | Yellow |
| " | (2)275 | Unusable color |
| " | (1)246 | Unusable color |
| " | (1)256 | Unusable color |
| " | (2)237 | Unusable color |
| " | (3)213 | Pink |
| " | (2)217 | Yellow |
| " | (1)246 | Yellow |
| " | (2)220 | Unusable color |
| " | (2)213 & (1)254 | Yellow |
| " | (1)256 | Unusable color |
| " | (2)278 | Unusable color |
| " | (2)275 | Green |
| " | (3)212 | Unusable color |
| " | (2)220 | Yellow |
| " | (2)216 | Unusable color |
| " | (2)275 | Orange |
| " | (1)246 | Unusable color |
| " | (3)254 | Unusable color |
| " | (3)214 | Unusable color |
| " | (1)256 | Yellow |
| " | (3)213 | Pink |
| " | (2)216 | Yellow |
| " | (1)246 | Lt. Orange |
| " | (2)220 | Pink |
| " | (2)237 | Orange |
| " | (2)271 | Pink |
| " | (2)278 | Unusable color |
| " | (2)275 | Unusable color |
| " | (2)254 | Unusable color |
| " | (2)237 | Lavender |
| " | (2)220 | Pink |
| " | (2)215 | Unusable color |
| " | (2)275 | Orange |
| " | (2)278 | Lt. Blue |
| " | (3)212 | Lt. Green |
| " | (2)255 | Yellow |
| " | (2)278 | Lavender |
| " | (2)219 | Lt. Blue |
| " | (3)220 | Pink |
| " | (2)275 | Pink |
| " | (1)246 | Blue |
| " | (1)256 | Pink |
| " | (2)271 | Unusable color |
| " | (2)282 | Unusable color |
| " | | Gray |

BASIC COLOR KEY

202 - Bastard Amber
203 - Dark Bastard Amber
204 - No Color Straw
205 - Light Straw
206 - Medium Lemon 207 - Dark Lemon
208 - Medium Straw
209 - Straw
210 - No Color Amber
211 - Flame
212 - Pale Amber
213 - Light Amber
214 - Medium Amber
215 - Golden Amber
216 - Amber
217 - Dark Amber
218 - Orange
219 - Orange Amber
220 - Pink Red
221 - Light Red
222 - Fire Red
223 - Medium Red
224 - Pure Red
225 - No Color Pink
226 - Flesh Pink
227 - Light Shubert Pink
228 - Shubert Pink
229 - Medium Pink
230 - Medium Pink
231 - Deep Pink
232 - Rose Pink
233 - Dark Rose Pink
236 - Light Magenta
237 - Medium Magenta
238 - Dark Magenta
239 - Rose Purple
240 - Violet
242 - Surprise Pink
243 - Medium Lavender
244 - Dark Lavender
245 - Light Purple
246 - Medium Purple
247 - Dark Purple
248 - Royal Purple
250 - No Color Blue
251 - Daylight Blue
252 - Pale Blue
253 - Light Sky Blue

BASIC COLOR KEY CONTINUED

254 - Special Steel Blue
255 - Azure Blue
256 - Light Blue
257 - Medium Blue
258 - Light Green Blue
259 - Green Blue [Moonlight]
260 - Sky Blue
262 - Medium Blue
263 - Medium Blue
264 - Urban Blue
265 - Dark Blue
266 - Dark Urban Blue
267 - Dark Blue
270 - Pale Green
271 - Light Green
272 - Medium Green
273 - Medium Green
274 - Dark Green
275 - Light Blue Green
276 - Blue Green
277 - Medium Blue Green
278 - Yellow Green
280 - Gray
281 - Chocolate
282 - Special Chocolate The invention thus provides a process in which a second latent image of a different color can be superimposed over a latent background image previously formed on a film for the production of a multi-color slide transparency without the need for precise registration of the layers containing the respective images from which the latent images are formed. As a result, slide transparencies can be produced from the exposed films containing sharp and precise images of different colors adjacent to and surrounding each other although the color of the superimposed image is not as intense as the color of the background image.

It is to be noted that the invention is particularly advantageous where the superimposed image is of relatively smaller area relative to the image of the background image on a film, such as where the superimposed image is lettering or numbering.

It is further noted that the type of transparent gel and film utilized in the process is similar to that as described in the above mentioned patent application. In addition, a film containing a number of superimposed images of different colors on a single background image can be produced as well as a film having a multiplicity of background colors with superimposed images of different colors. These films are useful, as in the above mentioned patent for the production of a multiplicity of slide transparencies having brilliant and intense background colors corresponding to the intensity of a transparent gel while being free of graininess. Further, the slide transparencies can be used for daylight projection as well as darkroom projection.

What is claimed is:

1. A process of producing a multi-color slide transparency comprising the steps of
    positioning an unexposed film in a predetermined position;
    registering a first layer containing a first transparent area thereon defined by a first transparent colored gel in alignment with said film;
    exposing said first transparent area to said film to form a latent colored image thereon corresponding to said first area;
    thereafter positioning a second layer containing a second transparent area thereon defined by a second different transparent colored gel in approximate alignment with said latent colored image on said film; and
    exposing said second transparent area to said film to form a second latent image, on said film within said first latent image, of a third color different from the colors of said first and second gels.

2. A process as set forth in claim 1 wherein said second latent image is of a relatively small size in relation to said first latent image.

3. A process as set forth in claim 1 wherein said second latent image is constituted by lettering.

4. In a process of producing a multi-color slide transparency wherein a film has a first latent image thereon of a color corresponding to a transparent gel the step of
    further exposing the film to a transparent gel of predetermined shape and different color from said first latent image within the area of said first latent image to produce a second latent image within said first latent image of a shape corresponding to said predetermined shape and of a color different from said first latent image and said transparent gel.

5. In a process as set forth in claim 4 wherein said second latent image constitutes lettering.

6. In a process as set forth in claim 4 wherein said second latent image is smaller than said first latent image.

7. A process of producing a multi-color slide transparency comprising the steps of
   positioning a first layer in a predetermined position aligned with a film, said first layer having an unexposed transparent area therein of a predetermined shape defined by a transparent gel of a first color;
   exposing said transparent area to said film to form a first latent image on said film corresponding to said predetermined shape and said first color;
   thereafter aligning a second layer with the exposed film, said second layer having a transparent area therein of a predetermined shape defined by a transparent gel of a second color; and
   exposing said transparent area of said second layer to said film within the area of said first latent image to produce a second latent image on said film, within said first latent image of a shape corresponding to said transparent area on said second layer, and of a third color different from said first color and said second color.

8. A process as set forth in claim 7 wherein said transparent areas of said first and second layers is each surrounded by a background of opaque black.

9. A process as set forth in claim 8 wherein said transparent area of said second layer constitutes lettering.

10. A process as set forth in claim 8 wherein said transparent area of said second layer constitutes intergers.

11. A process as set forth in claim 7 wherein said second latent image is substantially smaller than said first latent image.

12. In a process of producing a multi-color slide transparency the steps of
    positioning at least one first layer of transparent colored gel in alignment with an unexposed film;
    exposing a predetermined area of said film to at least a portion of said first layer to form a first latent background image on said film within said predetermined area of a color corresponding to said one layer;
    thereafter positioning at least one second layer of transparent colored gel of a different color from said first layer in approximate alignment with the exposed film; and
    exposing at least a portion of said predetermined area of said film to at least a portion of said second layer to form a second latent image, within and over said background image on said film, of a third color different from said colors of said layers.

13. A process as set forth in claim 12 wherein a plurality of layers of colored transparent gels are initially aligned with said film and exposed to said predetermined area therein.

14. A process as set forth in claim 13 wherein said plurality of layers are of different colors and said first latent background image is of a color corresponding to a mixture of said different colors.

15. A process as set forth in claim 12 wherein a plurality of layers of colored transparent gels of the same color are subsequently exposed to form said second latent image.

16. A process of producing a multi-color transparency wherein exposed film having a first latent image thereon of a color corresponding to a transparent gel or combination of gels is further exposed to a transparent gel or combination of gels of such shape and color as to produce a second latent image with overlap between the two images, the image color where there is overlap being different from the color where there is not overlap.

* * * * *